(12) United States Patent
Liu

(10) Patent No.: US 9,217,892 B1
(45) Date of Patent: Dec. 22, 2015

(54) CIRCULAR POLARIZER, LIQUID CRYSTAL PANEL AND THE LIQUID CRYSTAL DEVICE

(71) Applicant: Shenzhen China Star Optoelectronics Technology Co. Inc., Shenzhen, Guangdong (CN)

(72) Inventor: Ming Liu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/377,983

(22) PCT Filed: Jul. 17, 2014

(86) PCT No.: PCT/CN2014/082423
§ 371 (c)(1),
(2) Date: Aug. 11, 2014

(51) Int. Cl.
*G02F 1/1335* (2006.01)
*G02B 5/30* (2006.01)
*G02B 1/11* (2015.01)

(52) U.S. Cl.
CPC ............ *G02F 1/133528* (2013.01); *G02B 1/11* (2013.01); *G02B 5/3041* (2013.01); *G02F 2001/133541* (2013.01)

(58) Field of Classification Search
CPC ..................... G02F 1/133528; G02F 1/133536
See application file for complete search history.

(56) References Cited

U.S. PATENT DOCUMENTS

2013/0285539 A1\* 10/2013 Kim ........................ H05B 33/12
313/504

\* cited by examiner

*Primary Examiner* — Phu Vu
(74) *Attorney, Agent, or Firm* — Andrew C. Cheng

(57) ABSTRACT

A circular polarizer including a line polarizer with an absorption axis, at least one first antireflective film being arranged on a down surface of the line polarizer, and a quarter-wave plate being arranged on the down surface of the first antireflective film is disclosed. A slow axis of the quarter-wave plate and the absorption axis of the line polarizer form an included angle equaling to 45 or 135 degrees. In addition, a liquid crystal panel and the liquid crystal device including the circular polarizer are also disclosed. The light transmission rate of the circular polarizer may be enhanced by increasing the number of the antireflective film such that the display performance of the liquid crystal panel is enhanced. Further, the transmission rate of the liquid crystal panel and the light intensity of the backlight module may be relatively lowered down, which also reduces the costs.

20 Claims, 1 Drawing Sheet

CIRCULAR POLARIZER, LIQUID CRYSTAL PANEL AND THE LIQUID CRYSTAL DEVICE

BACKGROUND OF THE INVENTION

1. Field of the Invention

The present disclosure relates to liquid crystal display technology, and more particularly to a circular polarizer, a liquid crystal panel and a liquid crystal device capable of enhancing light transmission rate.

2. Discussion of the Related Art

The development of optoelectronics and semiconductor technology contributes to the development of flat panel displays. Among the flat panel displays, Liquid Crystal Display (LCDs) are characterized by attributes such as high space efficiency, low power consumption, no radiation, low electromagnetic interference, and so on, and thus have been the main trend of the market.

LCDs usually include liquid crystal panels and backlight modules (BLs). As the liquid crystal panel does not emit lights itself, the backlight module has to be arranged below the liquid crystal panel to provide a surface light source for the liquid crystal panel. As such, the liquid crystal panel is capable of displaying images by utilizing the surface light source provided by the backlight modules.

Usually, polarizers are attached respectively to an up surface and a down surface of the liquid crystal panel such that the liquid crystal panel is capable of displaying images normally. The polarizers may include glare polarizer and anti-glare polarizer. The light transmission rate of these polarizers are not high enough, which The light transmission rate of the glare polarizer may be in a range between 42% and 44%. The light transmission rate of the anti-glare polarizer may be in a range between 41% and 42%. The light transmission rate of the polarizers has a great impact on the display performance of the liquid crystal panel for the reason that the brightness of the liquid crystal panel has to be above a certain degree. If the light transmission rate of the polarizer is not enough, it is needed to increase the light transmission rate of the liquid crystal panel or to increase the light intensity of the backlight modules, which greatly increase manufacturing cost.

SUMMARY

In one aspect, a backlight module includes: a light guiding plate including at least one light incident surface; a light source unit being arranged close to the light incident surface; and a light conversion unit being fixed between the light source unit and the light incident surface, and the light conversion unit converts light beams emitted from the light source unit to white light beams.

In one aspect, a circular polarizer, comprising: a line polarizer comprising an absorption axis; a first antireflective film being arranged on a down surface of the line polarizer; and a quarter-wave plate being arranged on the down surface of the first antireflective film, and a slow axis of the quarter-wave plate and the absorption axis of the line polarizer form an included angle equaling to 45 or 135 degrees.

Wherein the circular polarizer further comprises: at least one second antireflective film being arranged on the down surface of the quarter-wave plate.

Wherein the circular polarizer further comprises a protection film being arranged on an up surface of the line polarizer.

Wherein the circular polarizer further comprises an adhesive layer being arranged on the down surface of the quarter-wave plate.

Wherein the circular polarizer further comprises an adhesive layer being arranged on the down surface of the second antireflective film.

Wherein the circular polarizer further comprises a release film layer being arranged on the down surface of the adhesive layer.

In another aspect, a liquid crystal panel comprising: a liquid crystal cell, a first circular polarizer arranged on an up surface of the liquid crystal cell, and a second circular polarizer arranged on a down surface of the liquid crystal cell, both of the first circular polarizer and the second circular polarizer comprises the above circular polarizers.

Wherein the liquid crystal cell includes: a first substrate, a second substrate, and a liquid crystal layer between the first substrate and the second substrate. The up surface of the first substrate is bonded with the first circular polarizer. The down surface of the second substrate is bonded with the second circular polarizer.

In another aspect, a liquid crystal device includes a backlight module and the above liquid crystal panel arranged above the backlight module, the backlight module is configured for providing a display light source to the liquid crystal panel such that the liquid crystal panel is capable of displaying images.

Wherein the backlight module is an edge-type or direct-lit backlight module.

In view of the above, the light transmission rate of the circular polarizer may be enhanced by increasing the number of the antireflective films such that the display performance of the liquid crystal panel is enhanced. Further, the transmission rate of the liquid crystal panel and the light intensity of the backlight module may be relatively lowered down, which also reduces the costs.

DETAILED DESCRIPTION OF THE EMBODIMENTS

Embodiments of the invention will now be described more fully hereinafter with reference to the accompanying drawings, in which embodiments of the invention are shown.

It should be noted that the relational terms herein, such as "first" and "second", are used only for differentiating one entity or operation, from another entity or operation, which, however do not necessarily require or imply that there should be any real relationship or sequence.

Figure 1:
FIG. 1 is a schematic view of the liquid crystal device in accordance with one embodiment.

FIG. 1 is a schematic view of the liquid crystal device in accordance with one embodiment.

The liquid crystal device includes a backlight module 10 and a liquid crystal panel 20 arranged above the backlight module 10. The backlight module 10 provides a display light source to the liquid crystal panel 20 such that the liquid crystal panel 20 may display image. In the embodiment, the backlight module 10 may be an edge-type or direct-lit backlight module. It can be understood that the structure of the backlight module can be easily conceived and thus will not be described hereinafter.

The liquid crystal panel 20 includes a liquid crystal cell 21, a first circular polarizer 22 arranged on an up surface of the liquid crystal cell 21, and a second circular polarizer 23 arranged on a down surface of the liquid crystal cell 21.

The liquid crystal cell 21 includes a first substrate 211, a second substrate 212, and a liquid crystal layer 213 between the first substrate 211 and the second substrate 212. It can be understood that the liquid crystal cell 21 also includes other components, which can be easily conceived and thus will not be described hereinafter.

The first substrate 211 may be a color filter substrate. The up surface of the first substrate 211 may be bonded with the first circular polarizer 22 by pressure sensitive adhesive (PSA). The second substrate 212 may be a thin film transistor (TFT) array substrate. The down surface of the second substrate 212 may be bonded with the second circular polarizer 23 by PSA. The liquid crystal layer 213 includes a plurality of liquid crystal molecules.

Figure 2:
FIG. 2 is a schematic view of the circular polarizer in accordance with a first embodiment.
Figure 3:
FIG. 3 is a schematic view of the circular polarizer in accordance with another embodiment.

The structure of the first circular polarizer 22 and the second circular polarizer 23 will be described in detail hereinafter. FIG. 2 is a schematic view of the circular polarizer in accordance with a first embodiment. It can be understood that the first circular polarizer 22 and the second circular polarizer 23 are illustrated in FIGS. 2 and 3.

Referring to FIG. 2, the circular polarizer includes a line polarizer 31, a quarter-wave plate 32, and a first antireflective film 33.

The line polarizer 31 includes an absorption axis absorbing light beams parallel to a longitudinal direction of the absorption axis. The absorption axis only allows the light beams vertical to the longitudinal direction of the absorption axis to pass through. As such, natural light beams may be transformed into polarized beams.

The quarter-wave plate 32 includes a slow axis forming an included angle equaling to 45 degrees or 135 degrees with the absorption axis of the line polarizer 31. In other words, the slow axis of the quarter-wave plate 32 and the absorption axis of the line polarizer 31 form the included angle equaling to ±45 degrees. In this way, when the natural beams are transformed into circular polarized beams after passing through the quarter-wave plate 32 and the line polarizer 31, The first antireflective film 33 is arranged on the down surface of the line polarizer 31. The quarter-wave plate 32 is arranged on the down surface of the first antireflective film 33. The light transmission rate of the circular polarizer may be enhanced by arranging the first antireflective film 33 on the up surface of the quarter-wave plate 32. In this way, the light intensity of the circular polarizer is increased. It can be understood that the overlapped first antireflective films 33 may be arranged. That is, by overlapping a plurality of first antireflective film 33, the light transmission rate of the circular polarizer is enhanced. Thus, a plurality of first antireflective film 33 may be arranged on the down surface of the line polarizer 31.

In addition, in the embodiment, the circular polarizer also includes a protection film 34 arranged on the up surface of the line polarizer 31 so as to protect the line polarizer 31.

In addition, the circular polarizer also includes an adhesive layer 35 arranged on the down surface of the quarter-wave plate 32. In the embodiment, the adhesive layer 35 may include, but not limited to, PSA. The circular polarizer further includes a release film layer 36 arranged on the down surface of the adhesive layer 35, which is capable of preventing the adhesive layer 35 from being polluted. It can be understood that when the circular polarizer is bonded with the liquid crystal cell 21, the release film layer 36 has to be stripped first.

FIG. 3 is a schematic view of the circular polarizer in accordance with another embodiment The differences between the circular polarizers in FIGS. 2 and 3 will be described hereinafter. Referring to FIG. 3, the circular polarizer further includes a second antireflective film 37 arranged on the down surface of the quarter-wave plate 32. By arranging the first antireflective film 33 and second antireflective film 37 respectively on the down surface of the line polarizer 31 and the quarter-wave plate 32, the light transmission rate of the circular polarizer may be increased so as to enhance the light intensity of the circular polarizer. It can be understood that a plurality of second antireflective films 37 may also be overlapped to enhance the light transmission rate of the circular polarizer. That is, a plurality of second antireflective film 37 may be arranged on the down surface of the quarter-wave plate 32.

Correspondingly, the adhesive layer 35 is arranged on the down surface of the second antireflective film 37 so as to bond the circular polarizer with the liquid crystal cell 21.

In view of the above, the light transmission rate of the circular polarizer may be enhanced by increasing the number of the antireflective film such that the display performance of the liquid crystal panel is enhanced. Further, the transmission rate of the liquid crystal panel and the light intensity of the backlight module may be relatively lowered down, which also reduces the costs.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A circular polarizer, comprising:
a line polarizer comprising an absorption axis;
a first antireflective film being arranged on a down surface of the line polarizer; and
a quarter-wave plate being arranged on the down surface of the first antireflective film, and a slow axis of the quarter-wave plate and the absorption axis of the line polarizer form an included angle equaling to 45 or 135 degrees.

2. The circular polarizer as claimed in claim 1, wherein the circular polarizer further comprises at least one second antireflective film being arranged on the down surface of the quarter-wave plate.

3. The circular polarizer as claimed in claim 1, wherein the circular polarizer further comprises a protection film being arranged on an up surface of the line polarizer.

4. The circular polarizer as claimed in claim 2, wherein the circular polarizer further comprises a protection film being arranged on an up surface of the line polarizer.

5. The circular polarizer as claimed in claim 1, wherein the circular polarizer further comprises an adhesive layer being arranged on the down surface of the quarter-wave plate.

6. The circular polarizer as claimed in claim 2, wherein the circular polarizer further comprises an adhesive layer being arranged on the down surface of the second antireflective film.

7. The circular polarizer as claimed in claim 5, wherein the circular polarizer further comprises a release film layer being arranged on the down surface of the adhesive layer.

8. The circular polarizer as claimed in claim 6, wherein the circular polarizer further comprises a release film layer being arranged on the down surface of the adhesive layer.

9. A liquid crystal panel, comprising:
a liquid crystal cell, a first circular polarizer arranged on an up surface of the liquid crystal cell, and a second circular polarizer arranged on a down surface of the liquid crystal cell, both of the first circular polarizer and the second circular polarizer comprises:

a line polarizer comprising an absorption axis;

a first antireflective film being arranged on a down surface of the line polarizer; and a quarter-wave plate being arranged on the down surface of the first antireflective film, and a slow axis of the quarter-wave plate and the absorption axis of the line polarizer form an included angle equaling to 45 or 135 degrees.

10. The liquid crystal panel as claimed in claim 9, wherein the circular polarizer further comprises at least one second antireflective film being arranged on the down surface of the quarter-wave plate.

11. The liquid crystal panel as claimed in claim 9, wherein the circular polarizer further comprises a protection film being arranged on an up surface of the line polarizer.

12. The liquid crystal panel as claimed in claim 10, wherein the circular polarizer further comprises a protection film being arranged on an up surface of the line polarizer.

13. The liquid crystal panel as claimed in claim 9, wherein the circular polarizer further comprises an adhesive layer being arranged on the down surface of the quarter-wave plate.

14. The liquid crystal panel as claimed in claim 10, wherein the circular polarizer further comprises an adhesive layer being arranged on the down surface of the second antireflective film.

15. A liquid crystal device, comprising:

a backlight module and a liquid crystal panel arranged above the backlight module, the backlight module is configured for providing a display light source to the liquid crystal panel such that the liquid crystal panel is capable of displaying images, the liquid crystal panel comprises:

a liquid crystal cell, a first circular polarizer arranged on an up surface of the liquid crystal cell, and a second circular polarizer arranged on a down surface of the liquid crystal cell, both of the first circular polarizer and the second circular polarizer comprises:

a line polarizer comprising an absorption axis;

a first antireflective film being arranged on a down surface of the line polarizer; and a quarter-wave plate being arranged on the down surface of the first antireflective film, and a slow axis of the quarter-wave plate and the absorption axis of the line polarizer form an included angle equaling to 45 or 135 degrees.

16. The liquid crystal device as claimed in claim 15, wherein the circular polarizer further comprises at least one second antireflective film being arranged on the down surface of the quarter-wave plate.

17. The liquid crystal device as claimed in claim 15, wherein the circular polarizer further comprises a protection film being arranged on an up surface of the line polarizer.

18. The liquid crystal device as claimed in claim 16, wherein the circular polarizer further comprises a protection film being arranged on an up surface of the line polarizer.

19. The liquid crystal device as claimed in claim 15, wherein the circular polarizer further comprises an adhesive layer being arranged on the down surface of the quarter-wave plate.

20. The liquid crystal device as claimed in claim 16, wherein the circular polarizer further comprises an adhesive layer being arranged on the down surface of the second antireflective film.

* * * * *